United States Patent [19]

Soncini et al.

[11] Patent Number: 5,731,017
[45] Date of Patent: Mar. 24, 1998

[54] PRESS FOR INJECTION MOLDING PLASTICS MATERIALS

[75] Inventors: Gino Soncini; Renzo Dal Pio, both of Montebelluna, Italy

[73] Assignee: OIMA S.p.A., Signoressa Di Travignano, Italy

[21] Appl. No.: 564,582

[22] Filed: Nov. 29, 1995

[30] Foreign Application Priority Data

Jan. 17, 1995 [EP] European Pat. Off. ............ 95830007

[51] Int. Cl.⁶ .................................................. B29C 45/66
[52] U.S. Cl. .................. 425/589; 425/450.1; 425/450.9
[58] Field of Search .................. 425/451.2, 589, 425/450.1, 451.7, 451.9, 595; 100/231, 258 A

[56] References Cited

U.S. PATENT DOCUMENTS

| | | | |
|---|---|---|---|
| 3,596,325 | 8/1971 | Hehl | 425/589 |
| 3,603,210 | 9/1971 | Florjancic | 425/589 |
| 3,975,133 | 8/1976 | Nussbaumer | 425/451.2 |
| 5,110,283 | 5/1992 | Bluml et al. | 425/589 |
| 5,352,394 | 10/1994 | Fujita et al. | 425/589 |

FOREIGN PATENT DOCUMENTS

| | | |
|---|---|---|
| 0213211 | 3/1987 | European Pat. Off. . |
| 2111540 | 6/1972 | France . |
| 1109356 | 8/1959 | Germany . |
| 1957052 | 5/1971 | Germany . |
| 57-209799 | 12/1982 | Japan . |
| 59-152832 | 8/1984 | Japan . |
| WO9417977 | 8/1994 | WIPO . |

Primary Examiner—Jay H. Woo
Assistant Examiner—Minh-Chau T. Pham
Attorney, Agent, or Firm—Sughrue, Mion, Zinn, Macpeak & Seas, PLLC

[57] ABSTRACT

A press for injection molding plastics materials is provided with at least one stay member and at least one strut member on the same side of a mold holding zone identified on such plates. The stay and strut members function to take up the clamping load applied through the mold-holding plates.

6 Claims, 2 Drawing Sheets

PRESS FOR INJECTION MOLDING PLASTICS MATERIALS

BACKGROUND OF THE INVENTION

This invention relates to a press for injection molding plastics materials and being of the type which comprises:

two plates, each having a mold holding zone defined thereon;

a means of producing a clamping load between said plates at said mold holding zones; and a reaction means to take up said clamping load.

Presses having such features are known from Egidio Perucca, "Dizionario di Ingegneria", Vol. X, 1978, page 822.

In these presses, mold-holding plates are closed, against each other, by a clamping load of adequate magnitude to counteract the injection force which is generated during the molding step and acts in the mold opening direction.

A first press design has the plates guided along pillars which are laid symmetrically around the mold holding zone. The pillars are interconnected at one end to a backplate; arranged to act between the backplate and the adjacent mold-holding plate is a clamping assembly, such as a hydraulic jack. Thanks to the layout of the pillars relative to the mold holding zone, the clamping load is accommodated in a symmetrical fashion by the pillars themselves acting as stay members between the mold-holding plates.

This arrangement of the pillars, while ensuring a symmetrical distribution of the stresses and possible deformations, still has a disadvantage in that it restricts access to the mold. This becomes serious with small-size presses where, due to the limited room available, the presence of the pillars is more likely to interfere with access to the mold.

From a second press design, the pillars have been removed and a saddle-like base substituted for them which is substantially U-shaped with the mold-holding plates and the clamping assembly positioned between the legs of the "U". In this way, the clamping load is taken up by the base which, thanks to its shape, provides unobstructed access to the mold.

Such a base, however, is subjected to forces which tend to spread the two legs apart. Accordingly, this base configuration can only be adopted for press constructions wherein the loads generated between the legs of the base are comparatively modes ones.

SUMMARY OF THE INVENTION

The underlying technical problem of this invention is to provide an injection molding press for plastics materials which is so designed and constructed as to obviate the afore-mentioned drawbacks besetting the prior art.

This problem is solved, in accordance with the invention, by a press as indicated being characterized in that said reaction means comprises at least one strut member and at least one stay member, both acting between said plates on the same side thereof with respect to said mold holding zones.

BRIEF DESCRIPTION OF THE DRAWINGS

The invention features and advantages can be better appreciated from the following detailed description of a preferred embodiment thereof, to be taken by way of non-limitative example with reference to the accompanying drawings, of which.

DETAILED DESCRIPTION OF THE INVENTION

Figure 1:
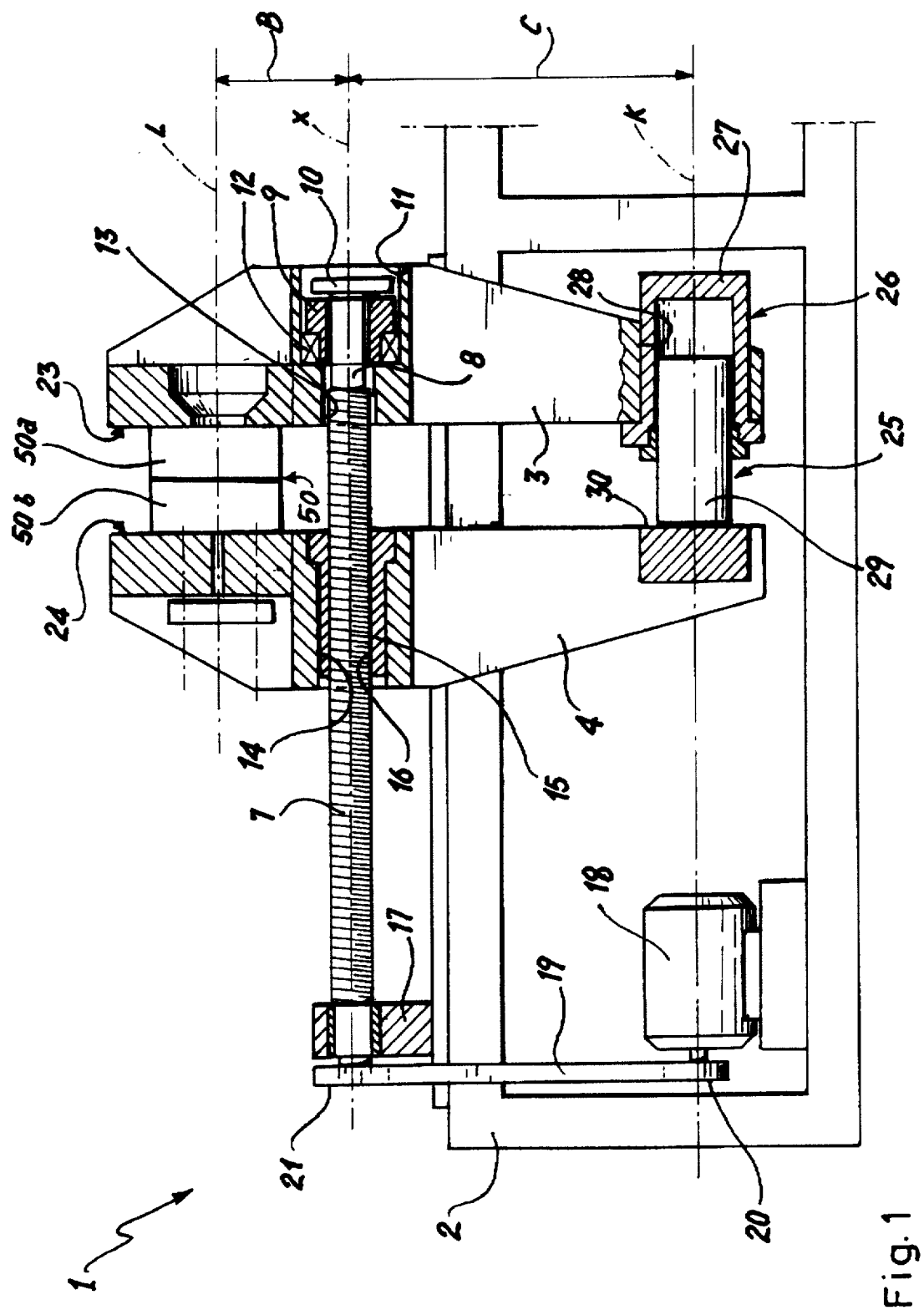
FIGS. 1 and 2 are partly cutaway elevation views showing schematically a press according to the invention at two different stages of its operation.
Figure 2:
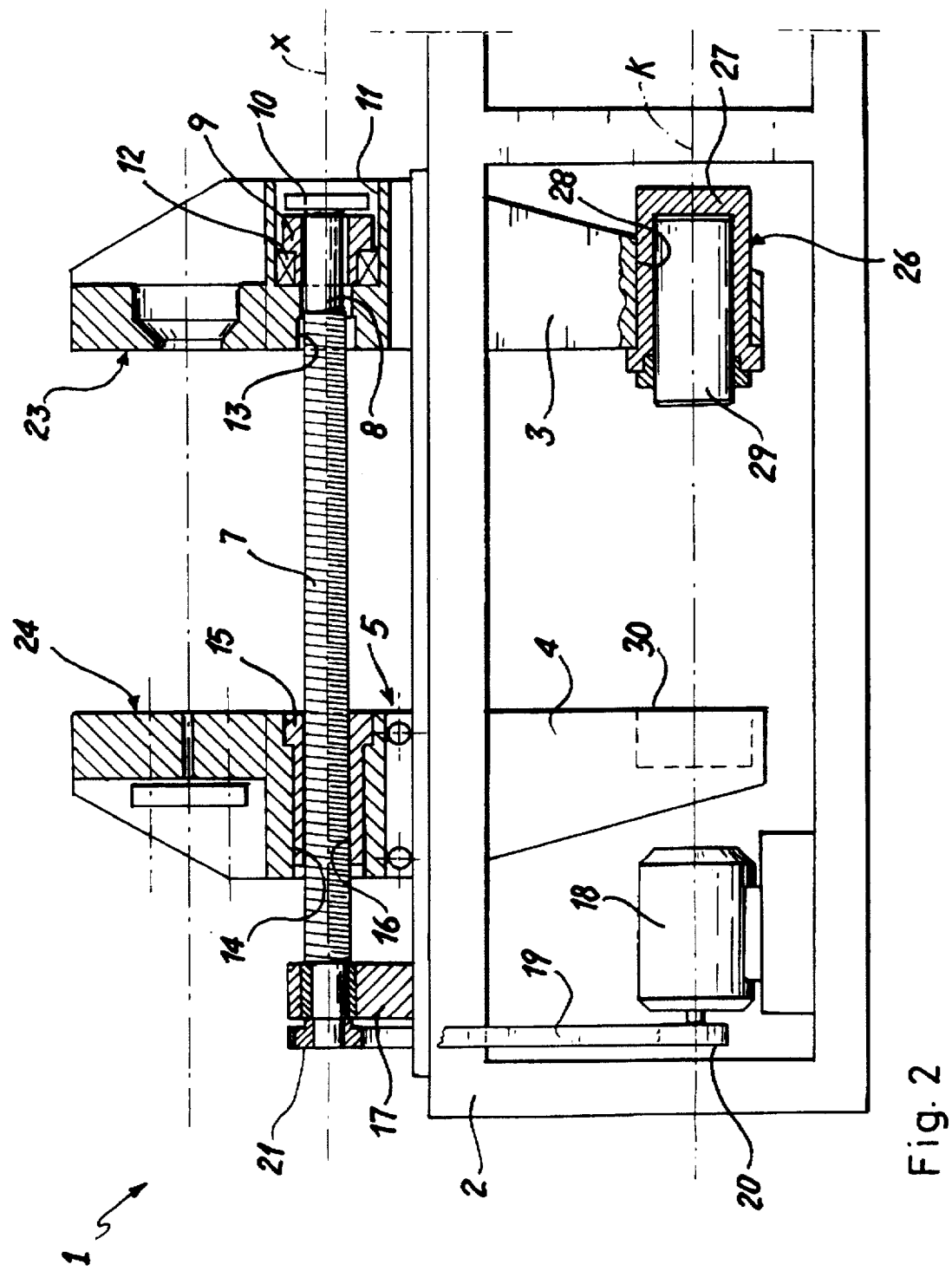

With reference to the drawing views, generally shown at 1 is an injection molding press for plastics materials which includes a structural frame 2 carrying two mold-holding plates 3 and 4, respectively, facing each other.

The plate 3 is secured on the frame 2, and the plate 4 is mounted on a carriage 5 and guided for a sliding movement toward and away from the plate 3.

The plates 3, 4 are interconnected by one or more crossbars 7 having a longitudinal axis X and being outside threaded.

Each crossbar 7 has, on an axial end thereof, a reduced diameter portion 8 onto which a sleeve 9 is fitted. The sleeve 9 is retained to the crossbar 7 by an end flange 10 of the crossbar and abuts into a seat 11 in the plate 3 with a thrust bearing 12 therebetween. The seat 11 is coaxial with a bore 13 in the plate 3 through which the crossbar 7 is passed.

The plate 4 is correspondingly formed with a bore 14 coaxial with the bore 13. Fitted into and retained axially within the bore 14 is a bush 15 which has an axial bore 16 therethrough. The bore 16 is threaded and screw engaged by the threaded portion of the crossbar 7.

The threaded engagement is an irreversible one, in the sense that displacement of the plate 4 along the axis X can only be achieved by rotation of the bar 7. When no such rotation occurs, the plate 4 position would be held immovable.

Accordingly, the crossbar 7 forms a driving member for shifting the plate 4 to and from the plate 3 along the axis X.

At the axially opposite end, the bar 7 is supported on the frame 2, rotatably in a pillow block 17, and is driven by a motor 18 through a drive belt 19 and pulleys 20, 21.

Each plate 3, 4 has a respective mold holding zone 23, 24 defined thereon on the same side of the axis X, in which zone a corresponding mold portion 50a,b of a split mold generally denoted by 50 will be positioned.

During the plastics injection step, pressure forces are developed within the die 50 which tend to push the mold portions 50a,b apart. The resultant of said pressure forces applies to the mold holding zone 23, 24, at approximately the barycenter thereof, along a line of action denoted by L in FIG. 1.

Each bar 7 is located on the same side of the line L, preferably at a spacing from the mold holding zones 23, 24 not to hinder access to the mold 50.

On the opposite side from the mold holding zones 23, 24 about the axis X, a strut-like member 25 is arranged to act.

The strut member 25 comprises a controllably extendible element formed of a hydraulic jack 26 which is mounted on the plate 3. The hydraulic jack 26 comprises a cylinder 27, received and held axially within a seat 28 in the plate 3, and a piston 29 reciprocable in the cylinder 27 along the direction of its longitudinal axis K.

The free axial end of the piston 29 works on a surface 30 of the plate 4.

As the bar 7 is rotated, the plate 4 moves towards the plate 3 into a closed position, as shown in FIG. 1, where the mold portions 50a,b kiss each other. On the jack 26 being operated by supplying pressurized oil into the cylinder 27, the piston 29 is urged to act onto the surface 30, thereby causing a clamping load to be applied to the mold portions 50a,b, which load will act approximately along the line L in FIG. 1.

Under this clamping load, each bar 7 is subjected to a tensile force at the section lying between the plates 3, 4, and will function as a stay member therebetween, whereas the piston 29 will function as a strut member under compression along the axis K. The combined bar 7 and jack 26 form a reaction means to take up the clamping load of the plates 3, 4.

The hydraulic jack 26 may be replaced with a rigid strut to be adjusted by means of a toggle linkage or a nut-and-screw arrangement, which can be extended controllably to apply and take up the mold clamping load.

The relative arrangement of the jack 26, bar 7 and mold holding zone 23, 24 is such that the lever arm, designated B, extending between the axis X and the line L is less than the lever arm, designated C, between the axis X and the line K. Consequently, the injection pressure force upon application of the clamping load can be counteracted by a push force, to be exerted by the jack 26 along the line K, which is less than the injection pressure force.

It is to be noted that the frame 2 is substantially relieved of stresses from the application of the clamping load and the injection pressure.

Thus, the invention does solve the problem, while affording a number of advantages over known solution. In particular, the forces acting on the mold are counteracted by structural elements arranged to function as struts and stays which also provide unrestricted access to the mold.

What is claimed is:

1. A press for injection molding plastics materials, comprising:

two plates, each having a mold holding zone defined thereon;

a means of producing a clamping load between said plates at said mold holding zones; and a reaction means to take up said clamping load, wherein said reaction means comprises at least one strut member and at least one stay member, both acting between said plates on the same side of said mold holding zones, and wherein said stay member extends between said plates at a location between said strut member and said mold holding zone and is comprised of a drive member for moving said plates toward and away from a closed position onto a mold.

2. A press according to claim 1, wherein said strut member comprises said means of applying said clamping load.

3. A press according to claim 2, wherein said means of applying said load comprises a hydraulic jack acting between said plates.

4. A press according to claim 1, wherein said stay member comprises a threaded bar being screw engaged in one of the plates and retained axially to the other plate.

5. A press according to claim 4, wherein said screw engagement is an irreversible one.

6. A press according to claim 1, wherein a line of action of said clamping load is defined in said mold holding zone and first and second lever arms being respectively defined between said line of action and said stay member and between said stay member and said strut member, the relative portions of the stay and strut members and the mold holding zones being such that said first lever arm is shorter than said second lever arm.

* * * * *